United States Patent [19]

Whitehurst et al.

[11] 4,383,094
[45] May 10, 1983

[54] CONTINUOUS REACTION/SEPARATION METHOD FOR SOLUTION POLYMERIZATION OF OLEFINS

[75] Inventors: Darrell D. Whitehurst, Titusville, N.J.; Tsoung Y. Yan, Philadelphia, Pa.

[73] Assignee: Mobil Oil Corporation, New York, N.Y.

[21] Appl. No.: 296,765

[22] Filed: Aug. 27, 1981

Related U.S. Application Data

[62] Division of Ser. No. 64,142, Aug. 6, 1979, Pat. No. 4,303,494.

[51] Int. Cl.³ .............................................. C08F 2/14
[52] U.S. Cl. ........................................ 526/88; 526/68
[58] Field of Search ....................... 526/62, 67, 68, 69, 526/70, 88; 422/131

[56] References Cited

U.S. PATENT DOCUMENTS

| | | | |
|---|---|---|---|
| 3,008,938 | 11/1961 | Irvin | 526/88 |
| 3,110,707 | 11/1963 | Bua | 526/70 |
| 3,136,747 | 6/1964 | Bonner | 526/67 |

Primary Examiner—Paul R. Michl
Attorney, Agent, or Firm—Charles A. Huggett; Michael G. Gilman; Charles J. Speciale

[57] ABSTRACT

A solid product resulting from the nucleated growth of the product on solid material of either the same or different composition and having a density higher than the reaction medium is formed from one or more liquid phase reactants by a method which comprises tangentially introducing the liquid phase reaction medium into the lower, smaller end of an inverted, frusto-conical reactor-separator, thereby imparting an upward swirling motion to the reaction medium in the reactor-separator, the horizontal velocity at the bottom of the reactor-separator being sufficiently large to cause fluidization of larger, solid product particles and concentration of them in the central lower portion of the reactor-separator and the vertical velocity at the top of the reactor-separator being sufficiently small to avoid carry-over of the smaller solid particles but sufficiently large to concentrate them in the upper portion of the reactor-separator; at least periodically recovering the larger, solid product particles in spherical form from the bottom of the reactor-separator; and recovering fluid products from the top of the reactor-separator. The method described is useful in a variety of reactions wherein a solid product forms by a nucleated growth mechanism. Examples of such reactions include thermal upgrading of petroleum derived feedstocks and coal liquids, synthesis of zeolites and Ziegler-Natta polymerization of olefins.

9 Claims, 8 Drawing Figures

THERMAL UPGRADING OF COAL LIQUIDS

COKING OF PETROLEUM FEEDSTOCKS

GROWTH OF ZEOLITES

POLYMERIZATION OF OLEFINS

CONTINUOUS REACTION/SEPARATION METHOD FOR SOLUTION POLYMERIZATION OF OLEFINS

This is a division of application Ser. No. 64,142 filed Aug. 6, 1979 now U.S. Pat. No. 4,303,494.

BACKGROUND OF THE INVENTION

1. Field of the Invention

This invention relates to a novel method for conducting chemical reactions involving one or more reactants maintained in a liquid phase reaction medium to form at least one product comprising a solid which accumulates in the reaction zone on particles of either the same or different composition by a nucleated growth mechanism. It provides a method whereby the reaction and the separation of the resulting product occurs in a single reaction-separation zone.

This invention also relates to a novel method for upgrading hydrocarbonaceous materials such as coal, petroleum derived material such as residual oils and heavy crudes, shale oils and tar sand extracts. More particularly, this aspect of the invention relates to a novel method whereby such hydrocarbonaceous materials may be continuously coked in a controlled manner to produce and separate a solid coke product. This aspect of the invention further relates to the conversion of solid carbonaceous materials to low sulfur liquid and solid fuels, particularly to an improved coal conversion process wherein dissolution of coal in a coal dissolution solvent and separation of undissolved solids and by-product coke from the solvent/coal extract mixture is achieved in a single step.

Another aspect of this invention relates to a method for carrying out polymerization reactions and particularly relates to a method for the polymerization of olefins employing Ziegler-type catalysts.

A still further aspect of this invention relates to a continuous method for the synthesis of zeolites having a substantially uniform crystal size.

2. Description of the Prior Art

Centrifugal reactors or reactors having a flow scheme characterized by a spiral flow of a fluid phase reaction medium are generally known. For example, U.S. Pat. No. 2,259,717 discloses a process for softening water by precipitating "hardness constituents" on cores of contact material which comprises introducing water into the lower portion of an elongated chamber containing granular contact material, adding a softening agent to the water substantially simultaneously with said introduction, and flowing the water containing said agent upwardly through said contact material at a velocity high enough to agitate and maintain the granular material in suspension but insufficient to carry the contact material out of the chamber. The patent suggests that the water be introduced into the chamber at such an angle as to flow upwardly into the chamber with a swirling motion. The chamber is preferably in the shape of an inverted, truncated cone. An advantage of the '717 process is said to be that precipitated hardness is collected in the form of enlarged granules rather than watery sludge and these granules can be more readily separated from water for disposal. The granular material grows in size as successive adherent layers of precipitates deposit on the surface. When the granular material reaches such a size that the upper surface of the expanded bed of granular particles nearly reaches the point in the upper portion of the reactor where the softened water is withdrawn, feed to the unit is discontinued, the solid particles are removed and fresh granular contact material is added to the unit. Thus, the operation is semi-continuous with the contact material being added on a periodic basis. Although the '717 process is particularly directed to the softening of water, the patent indicates that it is broadly applicable to the precipitation of electrolytes from solutions of the electrolyte by addition of a precipitant to the solution and flowing the resulting mixture through a bed of granular contact material as described above.

Various processes are known for thermally upgrading hydrocarbonaceous materials including thermal cracking, thermal reforming, vis-breaking, and coking. Known coking processes include delayed coking, continuous contact coking and fluid coking. In delayed coking processes a heavy fuel oil or gas oil is heated to a temperature above 900° F. and is then permitted to dissociate into coke and light ovehead by "soaking" in a coke drum. This operation is continued until the drum is filled with coke, after which it is taken offstream and the coke is broken out by mechanical or hydraulic means. Continuous contact coking is a process wherein a hydrocarbon feedstock is preheated to 750°–800° F. in a conventional tubular preheater. The hot oil is brought into immediate contact with a large quantity of hot circulating coke in the form of rounded lumps in the ¼ inch to the ¾ inch size range. This carrier coke is usually formed in the process itself. It is found that the hydrocarbon oil wets the solid particles quite uniformly in very thin layers. From the point of contact the hot, wetted coke is permitted to travel by gravity through the reactor zone in which it is given a soaking time of 15 to 40 minutes. The freely moving particles pass through a sealing zone into a heater where they are once again raised to proper recirculation temperature by exposure to radiative and some convective heating. Then the hot coke is returned to the point of contact with the hydrocarbon stock. A portion of the coke particles is continuously removed from the system as product. The removal generally takes place via a sizing unit so that the granules below ¾ inch may be returned to the process. In fluid coke processes the feed is sprayed into a fluidized hot bed of coke particles. The pellets of coke circulate continuously from the reactor bed into a fluidized burner bed where enough coke is burned to heat the remaining bulk of the pellets to about 1150° F. and the particles are then sent back to the reactor. Some of the coke particles are continuously removed and they are usually pulverized for use a power plant fuel. Fluid bed coking process is difficult to operate at relatively low temperatures except at very low feed rates due to the sticky feed causing loss of fluidity in the bed of solids.

A common characteristic of all of the foregoing thermal upgrading methods wherein a coke byproduct is formed is that they require large and expensive equipment. Moreover, delayed coking is a batch process and removing coke from the drums is an expensive and difficult operation. Both the moving bed and fluid bed processes require separate solids classification and separation equipment for the coke product. None of these processes has provided a highly effective and controllable low cost process for the conversion of hydrocarbonaceous materials into more valuable, lower boiling products.

A further problem encountered in liquid phase thermal upgrading processes is the presence of particles dispersed in the liquid product, the presence of which lowers the quality and economic value of the liquid product. A particularly notable example of this is the liquefaction of normally solid carbonaceous material such as coal.

In solvent refining processes for the conversion of coal to clean liquid or solid fuels, coal is heated in an organic solvent often in the presence of hydrogen to a temperature just sufficient to dissolve most of the organic material in the coal. Following this treatment the products are separated to yield a high boiling extract containing liquid hydrocarbons derived from coal in a solid phase composed of insoluble coal residues. The insoluble coal residues are sometimes only partially separated from the residue to permit the recovery of the residue in the form of a flowable slurry. The extract may then be recovered as a relatively low ash, low sulfur product resembling asphalt in appearance or, alternatively, the extract may then be separated and subjected to catalytic cracking or other refining operations for conversion of the high boiling material into lower boiling hydrocarbons. The solids separated from the extract have been subjected to a low temperature carbonization treatment for the production of additional liquid products which are useful as fuel. Processes which are exemplary of solvent refining processes are disclosed in U.S. Pat. Nos. 3,518,182, 3,520,794, 3,523,886, 3,748,254, 3,841,991 and 3,920,418.

The fundamental reaction of the solvent refining processes is depolymerization in solution of a major portion of the coal in a hydrogen donor solvent (usually having an aromatic composition) as a result of hydrogen transfer to the coal from the donor solvent. Subsequent steps separate the reaction products and recover solvent from the extract and from the solid residue. The separation of undissolved coal residue and ash from the solvent-extract solution is a most critical step in preparing clean fuels from coal by the solvent refining process and improved methods for their separation are needed.

It is well known that alpha olefins can be polymerized at low temperatures and pressures in the presence of certain catalyst compositions. Such processes are conducted at temperatures below about 150° C. and pressures below about 500 psi. These methods are further characterized by the presence of low pressure or "Ziegler" catalysts. In general, these catalysts can be obtained by treating a compound of the metal of Group IVB, VB, VI, VII or VIII with a metal of Group I, II or III in metallic hydride or organo metallic form. Monomers suitable for low pressure polymerization include ethylene, butylene, propylene, styrene and other alpha olefins. The polymer produced is often referred to as "crystalline", "low-pressure", or "linear". It is highly desirable that the product polymer should have the narrowest possible particle size distribution and good free-flowing properties.

For example, U.S. Pat. No. 2,971,951 discloses a process wherein a solid particulate catalyst is suspended in an upward-flowing, liquid phase stream of an olefin which is diluted with a suitable diluent hydrocarbon and effecting polymerization of the olefin to solid, non-tacky polymer in particulate form by contact with the catalyst under suitable reaction conditions which promote the formation and growth of solid particles of polymer in suspension; causing solid particles of polymer having a predetermined minimum size to settle against the stream of hydrocarbons; and recovering the settled particles. In one embodiment of the '951 patent, an apparatus is disclosed which comprises a reaction chamber having a substantially frusto-conical configuration positioned above and in open communication with a washing chamber, also having a frusto-conical configuration. The olefin and the inert liquid hydrocarbon diluent are separately or simultaneously introduced through a plurality of jets or spargers located near the joinder of the reaction and washing chambers. Particulate catalyst is continuously added near the top of the reaction zone and is maintained therein as a dense fluidized bed or mass of free-falling particles by the upward velocity of the olefin/diluent mixture. As the polymerization reaction in the reaction zone proceeds, particulate solid non-tacky polymer having a particle size exceeding the maximum size fluidizable in the olefin/diluent mixture are formed and settled out of the reaction zone, passed through the washing zone and are recovered.

U.S. Pat. No. 3,687,919 discloses a process for producing spherical particles of ethylenic monomers with controlled size distribution by a two-stage, polymerization method wherein a portion of the monomer is prepolymerized with turbulent agitation, the prepolymerized monomer is mixed with a large quantity of additional monomer and the resulting mixture is slowly polymerized with mild agitation. The quantity of monomer prepolymerized and the speed of agitation during the prepolymerization is said to serve as control on size distribution of the final product.

The synthesis of zeolites is generally accomplished by methods wherein aqueous solutions of template-inducing species such as specific inorganic or organic cations or organic amines and soluble sources of silica and alumina are reacted at temperatures between about 20° to 250° C. at atmospheric pressure to form the desired crystalline zeolite product. The zeolite crystals are then separated from the mother liquor and washed. The concentrations of soluble reactants and the temperature of the reaction are adjusted to give the desired $SiO_2/Al_2O_3$ ratio in the product and the desired rate of crystal growth. The reaction mixture is initially continuously or periodically stirred to insure homogeneity. After this mixing, agitation may be stopped as it is unnecessary to agitate the reaction mass during the formation and crystallization of the zeolite although mixing during such latter stages has not been found to be detrimental.

SUMMARY OF THE INVENTION

This invention may be applied to a wide variety of liquid phase reaction systems in which at least one of the products is a solid which has an intrinsic density greater than that of the reaction medium (which medium includes reactants, solvents and other products) and which forms by nucleated growth on solid material of either the same or different composition. As used herein, the term "nucleated growth" refers to the formation, grouping, and/or collection of material on and around a core of the same or different material. It is recognized that in some fields of technology such as crystallization the term "nucleated growth" is used in contradistinction to the term "seeded growth": the former term would refer to the crystallization of material around a core of the same material; the latter term would refer to the crystallization of material around a core of different material. Applicants stress that the use of the term "nucleated growth" in this application includes both "nucleated growth" and "seeded growth"

as those terms are used in arts such as crystallization. Similarly, the term "nuclei" refers to core material having a composition either the same or as different from the composition of the solid product which forms or collects thereon.

The invention resides in the discovery that in such reaction systems it is possible to continuously separate the more dense solid product from the soluble liquid and/or gaseous products by means of a unique reactor-separator. The reactor-separator defines an elongated, vertical reaction space of circular cross-section wherein the circular cross-sectional area generally decreases from top to bottom. The apparatus preferably has an inverted, truncated conical configuration but may have other configurations such as that defined by a series of inverted, truncated cones or by a truncated paraboloid of revolution or by a truncated hyperboloid of revolution of one sheet defined by the cartesian formula:

$$\frac{x^2}{a^2} + \frac{y^2}{a^2} - \frac{z^2}{b^2} = 1, \text{ wherein } z \geq 0.$$

In other words, all that is required of the configuration is that it have a generally decreasing circular cross-sectional area from top to bottom whereby the ratio of the diameter of the upper cross-sectional area to the diameter of the lower cross-sectional area (i.e., t/b) is greater than 1. The method of this invention comprises tangentially introducing the liquid phase reaction medium into the lower, smaller portion of the reactor-separator; maintaining a reaction medium therein in a swirling, fluidized state for a time sufficient for the desired reaction to occur; recovering fluid products and other fluid components of the reaction system from the upper portion of the reactor-separator; and recovering solid spherical product particles from the lower end of the reactor-separator.

The critical factors in the design of the reactor-separator employing the method of this invention are the t/b ratio, the height of the reactor (h), the ratio of the density of the solid product to the density of the medium (ds/dm), the inlet velocity of the reactant ($v_i$), the temperature of the reactor (T), the pressure of the reactor (P), and the volume of the reactor (V). These factors are not completely independent. The chemistry and physics of this reactor-separator are interdependent and both are governed simultaneously by more than one of these factors. The two most important physical parameters that must be controlled are the residence time and flow characteristics within the reactor.

The kinetics of the reactions producing the solid product are controlled by the reaction conditions, reactant concentration, temperature and pressure. These kinetics in turn define the residence time that must be used to produce solid particles of the desired quantity. Once this residence time is defined, the reactor volume is determined by multiplying the residence time by the volumetric flow rate ($v_i$).

The flow characteristics of the reactor-separator must be carefully controlled and must be optimized for the specific process being utilized. In order to bring about separation of the finest particles from the liquid medium at the top of the reactor the net vertical velocity of the liquid must be low at that point in the reactor. The horizontal velocity at the bottom of the reactor (i.e., at the reactant inlet) must be high enough to cause fluidization of large particles and concentrate them in the central lower portion of the reactor so as to facilitate their removal. Another critical parameter is ds/dm. At low values of this parameter, the vertical velocity at the top of the reactor must be kept low. This may be done by lowering $v_i$ or by increasing the t/b ratio of the reactor. At high values of ds/dm, flow rates can be much higher and t/b ratios can be closer to unity. With properly controlled flow characteristics in the reactor-separator, a controlled size gradation of solids is established within the reactor wherein small particles concentrate near the top of the reactor and large particles concentrate near the bottom of the reactor.

This gradation remains at steady state with small (newly nucleated) solid particles growing to larger particles due to reactions with or in the reaction medium. As particles grow larger their surface-to-volume ratio decreases and gravitational forces cause them to descend until they finally grow to the desired size and are removed from the bottom of the reactor.

Recovery of the solids can be accomplished in a number of ways. They may be continuously withdrawn as a slurry with some solvent, they may be removed periodically by rapid dumping or they may be intermittently collected in one of two or more settling vessels at the bottom of the reactor-separator which alternate between filling and dumping of solids. A unique feature of this process scheme is that the solids are produced in spherical form, the size of which can be carefully controlled by the parameter described above.

The reactor-separator of this invention has utility in a number of quite diverse commercial reactions which have the common characteristic that the solid products of those reactions form through a nucleated growth mechanism. Examples of such reactions include the continuous synthesis of zeolites, coking of petroleum feedstocks, thermal upgrading of coal liquids and Ziegler polymerization of olefins. The method of this invention is particularly advantageous when applied to the coking of petroleum feedstocks and thermal or catalytic upgrading of coal liquids in that it provides an environment wherein the degree to which the feedstock is coked may be controlled and produces a coke product having a uniform particle size which is readily separable from the reaction medium. Each of the foregoing reaction systems has different process requirements. The following detailed description of this invention will provide examples which illustrate the principal of the continuous reaction/separation method of this invention.

DETAILED DESCRIPTION OF THE INVENTION

Figure 1:
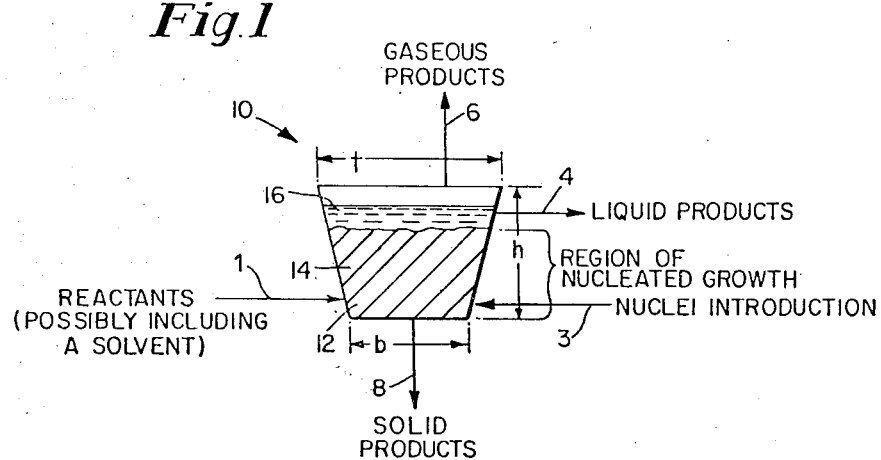
FIG. 1 schematically shows a reactor-separator suitable for use in the process of this invention.

Referring now to FIG. 1, the continuous reaction separation method of this invention will be described for reaction systems wherein a solid product resulting from the nucleated growth of the product on solid material of either the same or different composition, which solid product has a density higher than the reaction medium, is formed from one or more liquid phase reactants. The liquid phase reactants (which may include dissolved gases and/or a solvent for the reaction system) are introduced into the inverted frusto-conical reactor-separator 10 via line 1. As shown in the figure, the reactants are tangentially introduced into the lower smaller end of the reactor-separator thereby imparting an upward swirling motion to the reaction medium in the reactor-separator, the horizontal velocity at the bottom of the reactor-separator being sufficiently large to cause fluidization of larger, solid product particles and concentration of them in the central lower portion 12 of the reactor-separator 10 and the vertical velocity at the top of the reactor-separator being sufficiently small to avoid carry-over of the smaller solid particles but sufficiently large to concentrate them in the upper portion 14 of the reactor-separator. Liquid products and other liquid components of the reaction system form a layer 16 above the upper, solids-containing portion of the reaction-separator 14. The layer 16 is substantially free of suspended solid particles and the liquid products and other liquid components of the reaction system are continuously withdrawn therefrom via line 4. If gaseous products are formed in or are present in the reaction system, they are withdrawn from the top of the reactor-separator 10 via line 6. The larger, solid product particles which concentrate in the central lower portion 12 of the reactor-separator are allowed to grow by nucleated growth until the desired particle size is reached. The solid product particles are then withdrawn from the reactor-separator 10 through line 8. While FIG. 1 shows a single point of introduction of liquid reactants into the lower portion of reactor-separator 10 (i.e., through line 1), it will be understood that one or more such points of introduction may be used. Similarly, two or more liquid reactants may be introduced simultaneously into the reactor-separator 10 and these reactants may be simultaneously introduced either separately or in admixture with one another. The introduction sequence will be governed by the requirements of the particular reactions occurring in the reactor-separator. The region of nucleated growth in the reactor-separator 10 is generally defined by the upper (14) and lower (12) solids-containing portions of the reaction separation zone, and the residence time of the reaction system is calculated with reference to this region. If desired, nuclei may be introduced into the upper portion 14 of the region of nucleated growth or the lower portion 12 of the reactor-separator to promote the formation of solid product. The composition of the nuclei may be the same as or different from the composition of the solid product. Solid catalyst, if required by the reaction system, may also be introduced into the upper portion 14 of the region of nucleated growth or may be introduced into the lower portion 12 of the reactor-separator. The solid catalyst may or may not serve as a nuclei for the formation of the solid product particles, depending on the characteristics of the reaction system. Preferably, nuclei and/or solid catalysts are introduced through line 3 into the lower portion 12 of the reactor-separator.

While the continuous reaction separation method of this invention is broadly applicable to reaction systems wherein a solid product forms by nucleated growth in a liquid phase medium, it will be further described with more particular reference to the thermal or catalytic upgrading of petroleum derived feedstocks and coal liquids, synthesis of zeolites and Ziegler polymerization of olefins for the purpose of more clearly describing the inventive concept but it will be understood that this is merely in the interest of conciseness and clarity and implies no limitation, since by obvious modifications the present invention may be applied with equal success not only to the types of reaction listed above and described in more detail below, but also to many other reactions wherein a solid product forms by a nucleated growth mechanism.

Upgrading of Coal Liquids

By the term "coal liquids" is meant not only the liquid products produced by coal liquefaction processes, but also slurries of coal in a hydrocarbon solvent. The application of the continuous reaction separation method of this invention to the liquid product of coal liquefaction processes is described in the following description of the aspect of this invention relating to the upgrading of hydrocarbonaceous liquids. The presently described aspect of this invention particularly relates to the conversion of solid carbonaceous materials to more valuable liquid products.

Any solid carbonaceous material may be employed as "coal" in this aspect of the invention including natural coal such as high and low volatile bituminous, lignite, brown coal, peat, etc.

More particularly, this aspect of the invention relates to a method for converting solid carbonaceous material to low sulfur products wherein the carbonaceous material is heated in the presence of a coal liquefaction solvent for a time sufficient to dissolve the carbonaceous material, thereby producing a mixture which may be separated to recover a solvent refined coal product, recycled solvent, solid liquefaction zone residue and by-product gases. The solvent refined coal product is a low sulfur material known to have direct utility as a fuel. It is also known, however, that this product may be further upgraded by processes such as catalytic hydrogenation, hydrodesulfurization, hydrocracking, etc. to produce high quality hydrocarbon materials useful in a wide variety of applications wherein petroleum-derived products are currently used.

Included within the scope of the term "coal liquefaction solvent" as used herein are all solvents employed in the coal liquefaction step of solvent refining processes known in the art of coal conversion. Polycyclic, aromatic hydrocarbons which are liquid at the temperature and pressure of the extraction are generally recognized to be suitable solvents for the coal in the liquefaction step. At least a portion of the aromatics may be partially or completely hydrogenated, whereby some hydrogen transfer from solvent to coal may occur to assist in the breakdown of large coal molecules. Mixtures of the hydrocarbons are often used and these may be derived from subsequent steps in the process of this invention. Other types of coal solvent such as oxygenated aromatic compounds (e.g., phenols) may be added for special reasons, for example, to improve the solvent power, but the resulting mixture should be predominantly of the type mentioned.

Pilot plant experience with known solvent refined coal processes—particularly at the Wilsonville, Alabama SRC pilot plant and at the Ft. Louis, Washington PAMCO pilot plant—has shown that substantial problems are encountered with reactor solid build-up in reactor-separators. This experience has further shown that there are three distinct forms of reactor solids believed to be caused by three distinct mechanisms. The first type of solid causing reactor solid buildup is of organic origin and is primarily a coke-like material containing about 20 to 40% ash. The second type of solids formation encountered in conventional reactor dissolvers is due to reactions of the inorganic components of the raw coal, e.g., pyrites and calcium compounds. These materials have high ash contents (70 to 80%). The third type of solids encountered in reactor solids buildup is derived from physical phenomena, especially particle agglomeration in settling of heavy ash components like titanium. Titanium contents of solids recovered at Wilsonville have been very high (up to 20%). Sizes of agglomerated particles generally range from 25 to 100 mesh although there is evidence of appreciable amounts of smaller particles. When the solids buildup is particularly severe, it has been found that methods such as hydroblasting are needed to remove the solids from the reactor. Buildup of the first type of solid is believed to be very rapid. The coke-like solids are often associated with eastern coals and their rate of formation is related to operating conditions within the reactor—e.g., the use of excessive temperatures or "hydrogen deficient" solvents. Formation of coke or carbonaceous material is related to the formation of "mesophase" carbon from organic precursors. Mesophase is an intermediate between isotropic fluids (like pitch) and semi-coke. It has been shown during SRC runs at Wilsonville with Illinois No. 6 (burning star) feed coal that mesophase is laid down on inert particles. Subsequent heat treatment causes it to transform into semi-coke in the form of a "corona" around particles of coke contaminants, calcite and pyrrhotite. The propensity of SRC towards mesophase formation is dependent on the nature of the feed coal as well as the reaction conditions of the reactor dissolver.

One of the major economic problems associated with the conversion of coal to liquid fuels is the separation of unreacted coal and/or char which forms as a result of the process from the liquid products and solvent. Each coal has a different propensity toward the formation of char (coke). In almost every case, char formation can be induced by elevated temperature and/or reduced hydrogen donation capacity of the solvent and by the presence of nucleating specie. Char formation is often believed to be detrimental. However, process conditions which lead to the most rapid attainment of specification product (low-sulfur, higher hydrogen content material) also promote the formation of char. In the present invention, the formation of char is used to advantage. In typical liquefaction processes, char forms as a nucleated process and constitutes a rather small contribution toward the total product. This char is known to form on unreacted coal, ash and any other particulate solids which happen to be present in the reacting medium. This composite must be then separated from soluble products. The fact that an uncontrolled and very fine particle size of coal, ash and char is generally experienced in conventional practice, causes major problems in isolation of the product by filtration and other separation techniques. Sedimentation and other gravity related separation techniques also experience difficulty in that the separations are carried out at lower temperatures than reaction temperature and highly viscous solutions result.

In the present invention, particle size can be carefully controlled and the separation carried out at temperatures where the solutions are less viscous. In addition, the reactor also functions as a separator. When the particles grow to sufficient size, they settle to the bottom of the reactor and the resultant slurry is extremely easy to separate by simple percolation, screen draining, sedimentation or centrifugation techniques. It may also be desirable to wash the solids prior to final collection with a light solvent.

When the solids are recovered as a slurry, this resultant slurry can be directly gasified or combusted for power generation. Alternatively, the char can be sold directly as coke.

The liquid and gaseous products of the coal liquefaction reactions are also separated in the reaction-separation zone of this invention and the reaction solvent can be recycled either with or without catalytic hydrogenation depending on the desired mode of operation.

Figure 2:
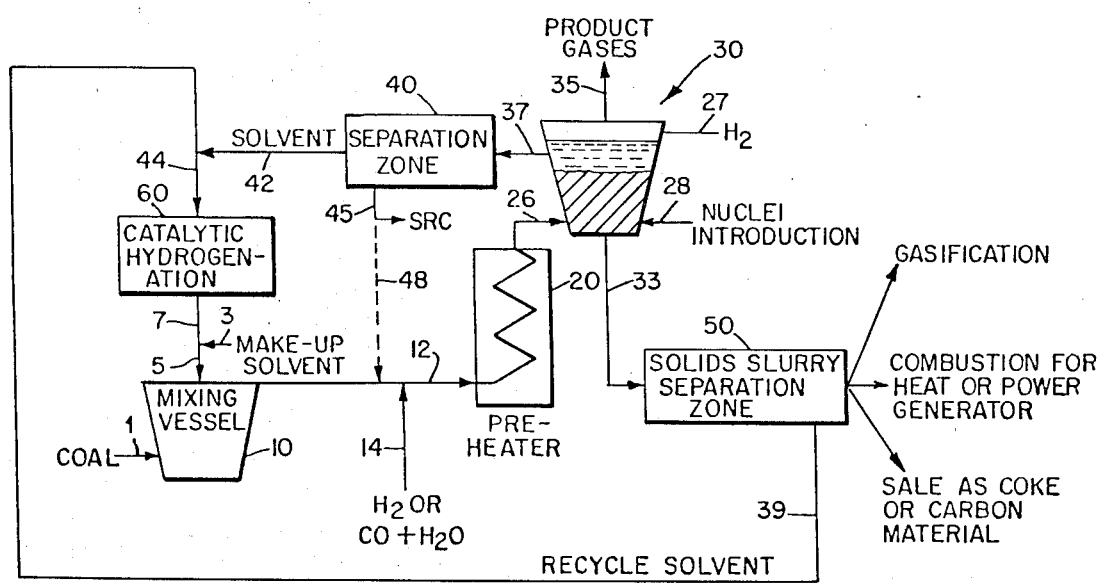
FIG. 2 is a schematic flow diagram of an embodiment of this invention for the conversion of coal to liquid fuel.

Referring now to FIG. 2, the method of this invention will be described as it is applied to conversion of coal to liquid fuel. Pulverized coal having a particle size below about 0.5 inch and preferably below about 0.1 inch is introduced through line 1 into mixing vessel 10 where it is mixed with coal liquefaction solvent introduced via line 5. Although not shown in the figure it is preferred that crushing and grinding of the coal be carried out in the presence of coal liquefaction solvent. This may be accomplished by either diverting a portion of the recycled solvent 7 or a portion of the makeup solvent 3 to the crushing/grinding step. The coal/solvent slurry passes from the mixing vessel 10 through line 12 to preheater 20. If desired, a reducing gas such as hydrogen or carbon monoxide or carbon monoxide in water may be added via line 14 to the slurry 12 entering the preheater 20 to aid the coal dissolution process. The preheater may comprise any suitable heating means but desirably is a tubular heater wherein the coal/solvent slurry is heated to reaction temperature.

The heated, coal/solvent slurry passes from the preheater 20 to the reactor dissolver 30 through line 26. In order to produce coal liquids of the desired specifications, the residence time of the coal in the reactor-separator 30 will desirably be between 5 minutes and 10 hrs. with a most preferred residence time of 0.5 to 1 hr. Reaction temperatures which promote the simultaneous coal liquid upgrading in char formation range from 600° to 1100° F. with a preferred temperature of from 800° to 1000° F. At very high temperatures, steam injection at the inlet of line 26 to reactor-separator 30 may be desirable to prevent fouling.

Nuclei may be added to the reactor-separator 30 via line 28 to aid in the formation of solid, spherical product. However, in coal liquefaction, an added nucleating agent is not often necessary because the intrinsic ash in undissolved coal can serve this purpose. Nevertheless, it may be desirable to add an agent such as a solid sulfur scavenger selected from the group consisting of metals, metal oxides, metals salts and mixtures thereof, said sulfur scavenger being capable of conversion to an insoluble sulfide or sulfur complex, to the reactor-separator 30 to promote the formation of a liquid fuel product having a reduced sulfur content. The use of such sulfur scavengers in a coal dissolution method has been described in copending, commonly-assigned U.S. patent application Ser. No. 728,660, of Oct. 1, 1976, the entire content of which is hereby incorporated by reference. It may also be desirable to to add catalytic material to promote hydrogenation reactions and lower coke yield. Inexpensive and disposable catalysts are preferred since they will function both as a hydrogenation catalyst and as nuclei for coke deposition. For example, the use of red mud, high-iron bauxite, manganese nodules, fly ash, liquefaction residues, etc. is disclosed in copending, commonly-assigned U.S. patent application Ser. No. 945,281, filed Sept. 25, 1978, the entire content of which is hereby incorporated by reference. In yet another variation of this invention, acidic solids may be added to promote coke formation.

At temperatures of about 850° F., coal softens almost instantaneously in the presence of coal liquefaction solvent and the expanding gases trapped within the coal particles cause vesiculation and swelling of the particles. Where, as is preferred, the slurry is preheated in a furnace-type heater 20 before introduction into the liquefaction zone (i.e., the reactor-separator 30), the softening begins while the coal particles are in furnace-type heater 20. Within approximately five minutes, the coal particles disintegrate to produce some low molecular weight, soluble materials which may be stabilized and hydrogenated or which may convert to mesophase carbon and form char or coke. The dispersed fragments (not necessarily liquefied) are thermally cracked to produce free radicals which can be recombined to form materials which are not soluble, even in pyridine. Since the depolymerized (cracked) coal molecules can either recombine with each other or be stabilized by accepting hydrogen, the degree of inhibition will depend on the amount of available hydrogen which is present in the reactor-separator 30.

In a preferred embodiment of this invention, substantially all of the initial coal solubilization is accomplished in preheater 20. Hydrogen or other added reducing gases added through line 14 are not allowed to flow as a separate gaseous phase through the reactor-separator 30 to avoid disruption of the solids separation occurring in the separator 30. Instead, hydrogen is predissolved in the reaction medium entering the reactor 30 through line 26, the reaction medium present in the reactor 30 being maintained at a hydrogen saturation level. Alternatively, or additionally, hydrogen may be added through line 27 to the reactor 30 to maintain the hydrogen pressure therein. Note that line 27 enters reactor 30 at a point above the liquid phase reactants—in the gaseous zone.

The following are typical operating conditions of this aspect of the method of this invention:
(1) A solvent to coal weight ratio within the range from about 1:2 to 3:1,
(2) a temperature of about 800° F.,
(3) a pressure of about 2800 psi, and
(4) a residence time for the reaction medium of 48 minutes.

If 15 cubic feet per hour of material is introduced into the reactor-separator 30, the reactor volume must then be 19 cubic feet. Under these conditions the physical nature of the solids and liquids present in the reaction zone are as described in the following table.

TABLE I

| Organic Solids | |
|---|---|
| Density | |
| 25% Ash | 1.1 g/cc |
| 50% Ash | 1.8 g/cc |
| Particle Size | |
| 68% > 100 mesh | |
| 80% > 200 mesh | |

TABLE I-continued

| Inorganic Solids | |
|---|---|
| Density | |
| Kaolinite | 2.6 g/cc |
| Calcite | 2.7 g/cc |
| Pyrite | 5 g/cc |
| Solvent | |
| Density | 0.6 g/cc |
| Viscosity | .25–.35 centipoise |

According to Stokes Law the free settling rate for suspended spherical solids in a system wherein the Reynolds number is less than 2 can be calculated by the following formula:

$$V = \frac{2ga^2(d_1 - d_2)}{.9\gamma}$$

Where
V = settling rate
g = gravitational force
$d_1$ = density of settling solid
$d_2$ = density of liquid
$\gamma$ = viscosity of liquid (poise)

If the density of the settling solids is assumed to be about 1.3 g/cc, the density of the liquid is assumed to be about 0.6 g/cc, and the viscosity of the liquid is assumed to be about 0.32 centipoises, the maximum vertical flow rate at the top of the reaction to retain 100 mesh particles (0.0149 cm. in diameter) is 308 feet per hour. The settling rates for other particle sizes are shown in Table II below.

TABLE II

| | 48 mesh | 200 mesh | 10 micron |
|---|---|---|---|
| Diameter (cm) | 0.2 | 0.0037 | 0.001 |
| Settling Rate (ft/hr.) | 600 | 76 | 1.4 |

Using the operating conditions given above, the dimensions of the reactor can be calculated. The vertical flux of liquid is given by the volumetric flow rate divided by the cross-sectional area of the reactor. If ten micron particles are to be retained, this flux must be less than 1.4 feet per hour at the top of the reactor. Therefore, at an inlet flow rate of 15 cubic feet per hour to the reactor-separator, the diameter at the top of the reactor-separator must be about 2 feet. The total reactor volume of 19 cubic feet could then be contained in an inverted frusto-conical vessel about 5 feet tall and having a diameter at the top of about 2 feet. With a 2 inch withdrawal pipe at the bottom of the reactor-separator 30, particles having a size range of about 40 to 50 mesh will settle to the bottom of the reactor and may be removed. Removal can be accomplished by various means such as by a screw or swinging lock hopper apparatus.

Tangential introduction of the reaction medium 26 into the lower portion of reactor-separator 30 having the above-described configuration, results in a distribution of solid coke-like particles having a controlled size gradation wherein the smaller particles are concentrated near the top of the reaction zone and the larger particles are concentrated near the bottom of the reaction zone. Moreover, providing a reactor-separator wherein the diameter of the upper cross-sectional area is such that the vertical flux of liquid across that cross-sectional area is less than the free settling rate of 10 micron particles in the reaction medium, results in a layer of substantially solids free liquid above the region of nucleated growth. This liquid layer comprises solvent and solvent refined coal. As shown in FIG. 2, this substantially solids-free product is withdrawn from reactor-separator 30 through line 37 to separation zone 40 wherein a suitable separation means (e.g., a distillation column) separates a recycle solvent fraction 42 from the product liquid and a solvent refined coal product 45 is recovered. Product gases are recovered from the reactor-separator 30 through line 35.

The product distribution may be shifted towards the formation of greater quantities of distillate materials and coke by passing all or a portion of the solvent refined coal product 45 through line 48 to line 12 (line 48 is shown as a dotted line in FIG. 2). For example, when separation zone 40 is a distillation column as described in the preceding paragraph, heavier, 650°–1000° F.+material from the separation zone 40 is recycled to the reactor dissolver 30 through lines 12 and 26 and preheater 20. More preferably, a 750°–900° F. cut is recovered from separation zone 40 and recycled to reactor dissolver 30 and heavier material is removed from the process as a product.

It is known that, with mild agitation, coal particles dissolve and disintegrate to very fine particles having diameters of about 10 microns. These particles, once formed, will then grow by nucleated coke formation on their surfaces. By proper design of the reactor, complete retention of the particles in the reactor can be achieved and filters completely eliminated. The large solid particles which form settle to the bottom of the reactor-separator 30 and can be removed from the bottom thereof as a slurry through line 33. The solids slurry passes through line 33 to solids slurry separation zone 50 which may comprise any of a variety of known separation techniques. For example, zone 50 may comprise mechanical separations such as percolation, screen draining, sedimentation, and/or centrifugation to separate hydrocarbonaceous liquid from the coke-like solids. See McCabe and Smith, Unit Operations of Chemical Engineering, 2d Ed., pages 865, et seq., McGraw-Hill Book Co., New York, N.Y. (1967). The ease of such a separation is greatly enhanced by the relatively large, uniform size of the solids. Washing the solids with a light solvent prior to final collection may also be desirable to maximize liquid recovery. The coke-like solids recovered may be used as a fuel or they may be coked or gasified by methods well-known in the art. The separated liquid may be directly returned to the mixing vessel 10 through line 33 or may be distilled to recover a 400° F.+recycle solvent fraction which is returned to the mixing vessel 10 and lower-boiling liquid products. Alternatively, separation zone 50 may comprise a coking or gasification step wherein the solids slurry 33 is directly coked or gasified without a preliminary solids/liquid separation step. The foregoing is exemplary of the various schemes which may comprise separation zone 50 but is not limiting since other schemes will be obvious to those skilled in the coal processing art. However, in all cases, the solids slurry recovered from reactor-separator 30 contains easily separable solids of relatively uniform size which will increase the solids separation efficiency of any of the possible separation schemes.

In a special embodiment of this aspect of the invention, enhanced solids recovery from the solvent refined coal liquid product withdrawn from reactor-separator 30 may be attained by addition of a displacement liquid to the portion of the reactor-separator 30 below the point of introduction of coal/solvent slurry through line 26. Tangentially introducing the displacement liquid at substantially the same velocity as that of the coal/solvent slurry introduced through line 26, a liquid/liquid interface is formed and maintained through which the larger coke-like particles in the reaction zone gravitate. Solids-containing displacement liquid is then withdrawn from reactor-separator 30 through line 33, the displacement liquid separated from the coke-like solids and returned to the reactor-separator, and the separated, relatively liquid-free, coke-like solids recovered for use as fuel or for further subsequent processing such as coking or gasification. The displacement liquid may be any aqueous or hydrocarbonaceous liquid which will allow maintenance of an interface between the solids-containing hydrocarbonaceous reaction medium present in zone 30 and the displacement liquid. The displacement liquid should have a specific gravity which is greater—e.g., at least 0.05 specific gravity units greater and preferably at least 0.10 specific gravity units greater—than the specific gravity of the hydrocarbonaceous liquid product. The principles of displacement liquid coal dissolution products separation are disclosed in U.S. Pat. No. 3,661,774, the entire contents of which are hereby incorporated by reference. The application of those principles to the process of the present invention is described above.

The recycle solvent passing from separation zone 40 through line 42 is combined with the recycle solvent 39 recovered from the solid product slurry 33 and the combined recycle solvent stream 44 is returned to the mixing vessel 10. If desired, the recycled solvent may be catalytically hydrogenated in zone 60 prior to its introduction to mixing zone 10 through line 7. When necessary, makeup solvent may be added to the recycle solvent 7 via line 3 and the combined solvent stream added to the mixing zone 10 through line 5.

Although the method of this aspect of the invention has been described in detail with reference to only one set of operating conditions, the exemplified procedure may be applied to any of the wide variety of operating conditions encountered in solvent refined coal processes. Briefly, the following procedure is used. First, the quantity of coal to be processed, the solvent to coal ratio, the temperature, and the pressure of the reaction system are determined. Given this information, the reactor volume may be calculated. The minimum upper diameter of the reaction zone is determined from Stokes Law once the minimum particle size of the solid product to be retained in the reaction zone is determined. The reaction zone is an elongated, vertical reaction space of circular cross-section wherein the circular cross-sectional area generally decreases from top to bottom. Preferably, the reaction zone is an inverted, truncated cone. The height of the reactor is calculated from routine geometric formulas. The horizontal velocity of the feed entering the reactor-separator is sufficiently large to fluidize larger solid particles and concentrate them in the central lower portion of the reaction zone but is sufficiently small to allow settling of the larger solid product particles removed from reactor-separator 30 through line 33.

The yield of liquid, gas, and unreacted coal and char has a major bearing on the economics of coal liquefaction processes. Reported yields of known processes can be misleading because of energy and raw material (e.g., hydrogen) requirements which are not reflected in the reported yields. For example, if coal having a H:C mole ratio of 0.8 is to be converted to a "premium liquid product" having a H:C mole ratio of 2:1, the "maximum theoretical" weight yield is about 78% liquids by weight of dry coal (assuming that coal forms only the "premium liquid product" and coke having a H:C mole ratio of 0.5). Alternatively, if the heating value of the coal is assumed to be 12,000 BTU/lb. and the heating value of the product liquid is assumed to be 17,000 BTU/lb., the "maximum theoretical" weight yield is 71% liquids by weight of dry coal. However, coal is also needed for process heat and for hydrogen production if the process is to be self-sufficient. This may be expected to reduce thermal process efficiency about 65-75%. Thus, the expected liquid yield in a self-sufficient plant is about 46-53% liquids by weight of dry coal. Reported coal liquefaction yields are often higher than this since they are based solely on coal fed to the dissolvers. However, such yeilds are misleading because additional coal must be consumed elsewhere in the plant for power, process heat, and hydrogen production. Controlled production of a hydrogen-deficient product (coke) is a desirable and necessary step in the overall optional liquefaction of coal.

Improved coal liquefaction processes are needed which provide the kind of flexibility which allows attainment of process "self-sufficiency." The method of the present invention has unique characteristics which provide this kind of flexibility.

The art recognizes three stages of coal conversion: dissolution, hydrogen transfer and hydrogenation. Coal conversion may be represented by the following general formula:

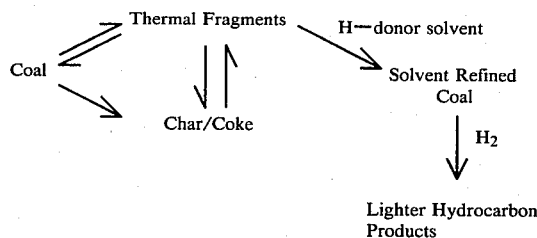

A good solvent is apparently one which retards the condensation of thermal fragments into char or coke. In such a solvent the thermal fragments will interact with the hydrogen-donor solvent to form solvent refined coal. When a hydrogen-donor solvent interacts with coal there is an initial decrease in hydrogen-donor capacity which then increases with time as the solvent is regenerated. It is possible that the hydrogen-donor capacity can be effectively zero for a finite time. During this period coking could well occur since thermal fragments cannot be hydrogenated.

Conditions which can lead to semicoke formation include: high asphaltol content (benzene insolubles), high temperatures, long contact times, low solvent hydrogen-donor capacity, and high phenol content. External solvent regeneration may reduce coke formation by replenishing the hydrogen-donor capacity of the solvent and by reducing the concentration of phenols.

The method of the present invention provides a convenient and efficient means whereby the quantity of solids formed in the dissolution zone may be controlled and whereby the solids formed may be recovered for subsequent use (i.e., generation of heat, power, and hydrogen). By controlling the hydrogen available to the coal and/or coal-derived materials present in the reactor-separator of the present invention, the quantity of char/coke formed in the reactor-separator may be controlled. Referring to FIG. 2, the hydrogen available to the coal may be controlled by solvent hydrogenation in catalytic hydrogenation zone 50, by controlling the ratio of recycle solvent 7 to fresh solvent 3 entering mixing vessel 10 through line 5, by controlling the hydrogen pressure in reactor 30 by addition of hydrogen through line 27, and by controlling reducing gas addition through line 14 to the coal/solvent slurry passing from mixing vessel 10 through line 12 to preheater 20.

Coking of Hydrocarbonaceous Liquids

Figure 3:
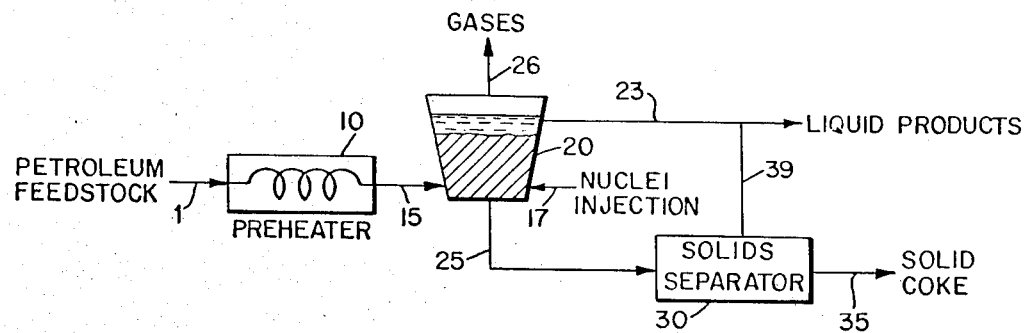
FIG. 3 is a schematic flow diagram of an embodiment of this invention for coking hydrocarbonaceous liquids such as petroleum feedstocks.

The continuous coking of hydrocarbonaceous liquids according to the continuous reaction separation method of this invention proceeds in a manner similar to that described above for the conversion of coal to more valuable liquid products. The feedstock most desirable in the practice of this aspect of this invention are petroleum feedstocks of low API gravity (less than 20 degrees API). These feedstocks include atmospheric and vacuum resids, shale oils, tar sand extracts, heavy crudes, etc. Desirable products are produced under conditions of 700° to 1100° F. (preferably 800° to 1000° F.), autogenous pressure and residence times within the range from about 10 minutes to 20 hours (preferably from about 30 minutes to 5 hours). Steam may be co-injected at a rate of about 1:2 lbs. per barrel of oil to prevent fouling. Hydrogen or carbon monoxide and water may be added to improve liquid product quality; hydrogen pressures may range from 300 to 3000 psi. Nucleation can be induced by injection of powdered coal, sawdust, ash, disposable catalysts, etc. into the reactor. Coupling of this aspect of the invention with coke gasification or combustion is a desired embodiment. Referring to FIG. 3, liquid hydrocarbonaceous material is introduced through line 1 into preheater 10 where the liquid is raised to the coking temperature. The heated hydrocarbonaceous material is tangentially introduced through line 15 into reactor-separator 20 where solid coke particles are formed by a nucleated growth mechanism in the swirling upwardly flowing reaction medium. Solid coke product having a desired particle size is withdrawn from the bottom of reaction zone 20 by line 25 and passes to separation zone 30 hwerein the solid product slurry is separated to recover a solid coke product through line 35 and liquid product through line 39. Substantially solids-free liquid product is withdrawn directly from the upper portion of reaction zone 20 through line 23. Product gases are withdrawn via line 26. If desired, nuclei may be injected to the lower portion of solids-containing reaction medium in reactor-separator 20 through line 17.

In a preferred embodiment, coking in the reactor-separator 20 may be promoted by the addition of acidic materials through line 17. Coke forms as a thin film on the surface of the acidic material and results in a material better suited for subsequent gasification than the relatively hard spheres of solid coke which otherwise would form in reactor-separator 30.

A further preferred embodiment of this aspect of the present invention relates to a method for controlled hydrogenative coking. Like coal liquefaction processes, it is desirable to provide the engery and hydrogen requirements of the process from the hydrocarbonaceous liquid feed. More particularly, it is desirable to produce sufficient char and/or coke in reactor-separator 20 to meet energy and hydrogen requirements of the process by char/coke combustion and gasification. For example, it is known that conventional coking (e.g., delayed coking) of heavy oils produces coke in excess of the amount necessary for generation of hydrogen to meet process requirements By controlling the hydrogen partial pressure in reactor-separator 20 by adding a controlled amount of reducing gas (e.g., hydrogen or carbon monoxide and water) to the liquid hydrocarbonaceous material introduced through line 1 into preheater 10, the amount of coke formed in reactor-separator 20 may be controlled and adjusted so as to balance coke formation with coke consumption.

Continuous Synthesis of Zeolites

Figure 4:
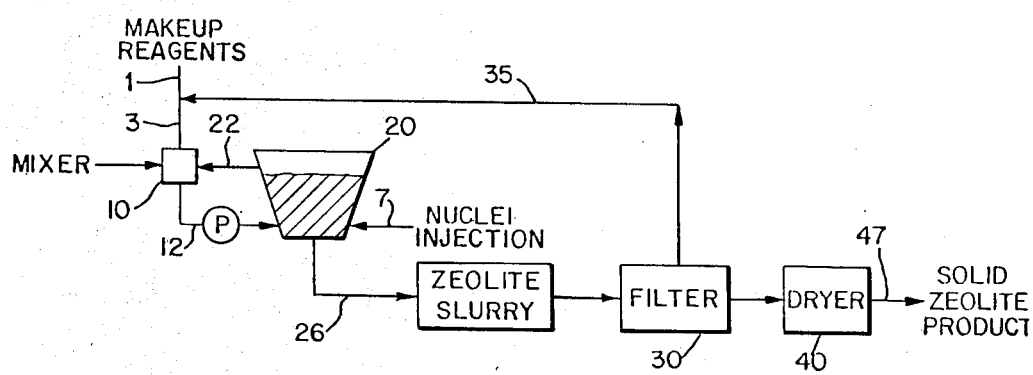
FIG. 4 is a schematic flow diagram of an embodiment of this invention for the synthesis of zeolites.

Referring now to FIG. 4, the use of the reaction separation method of the present invention will be described with reference to the continuous synthesis of zeolites. The solvent for the reaction mixture is water. Reactants include soluble sources of silica and alumina and template inducing specie such as specific inorganic or organic cations or organic amines. The specific reactants employed are determined by the zeolite to be synthesized and do not form a part of the present invention. Suitable reactants and the quantities of those reactants are obvious and known to those skilled in the art of zeolite synthesis. Make-up reagents introduced through line 1 and reaction medium recycled from filter 30 through line 35 pass via line 3 to mixing vessel 10 where they combine with solvent recycled from reactor separator 20 through line 22 to form the reaction medium. The reaction medium is tangentially introduced through line 12 into reactor-separator 20 where zeolite particles are formed and grow by a nucleated growth mechanism in the swirling, upwardly-flowing reaction medium. Nuclei comprising small crystals of the zeolite desired are preferably introduced through line 7 into the lower portion of the reactor-separator 20. The volume of reactor and the inlet velocity of the reaction medium introduced via line 12 are adjusted to define a crystal residence time in the reactor-separator 20 generally within the range from about 10 minutes to 10 hours, depending on the crystal size desired. The concentrations of the water-soluble reactants and the temperature of the material in reactor-separator 20 are adjusted to give the desired $SiO_2:Al_2O_3$ ratio in the product zeolite and the desired rate of crystal growth. Temperatures above the atmospheric boiling point of the solvent are achieved by sealing reactor-separator 20 and pressurizing the reaction system maintained therein. Generally, temperatures between 20° and 250° C. are preferred. The ratio of densities ds/dm generally ranges between 1.1 to 2.5.

The horizontal velocity at the bottom of reactor-separator 20 is sufficient to cause fluidization of larger zeolite particles, concentrating them in the central lower portion of the reactor-separator. The vertical velocity at the top of reactor-separator 20 is sufficiently small to avoid carryover of smaller zeolite particles but is sufficiently large to concentrate them in the upper portion of the reactor-separator. Solvent and other liquid components of the reaction system form a layer above the upper, solids-containing portion of reactor-separator 10. The layer is substantially free of suspended zeolite solids. Solvent and other liquid components of the reaction system are withdrawn from this layer through line 22 to mixing vessel 10 and recycled through line 12 to reactor-separator 20. Zeolite particles grow by nucleated growth in reactor-separator 20 until the desired particle size is reached. These larger, zeolite particles concentrate in the central lower portion of the reactor-separator and are withdrawn therefrom as a zeolite slurry through line 26. Zeolite solids are separated from the slurry in filter 30 and pass to drier 40 wherein the zeolite is dried and recovered through line 47. Reaction medium separated from the zeolite solids in filter 30 is returned through line 35 to mixing vessel 10.

Synthesis of zeolites according to the process of this invention provides considerable flexibility in the production of zeolite particles having various particle sizes. For example, a series of two or more reactor-separators may be employed. A portion of the zeolite slurry withdrawn from the first reactor-separator (e.g., a portion of the slurry passing through line 26 in FIG. 4) is passed to a second reactor-separator (not shown in FIG. 4) wherein the zeolite particle size continues to grow. Make-up and recycle reagents are added to the second reactor-separator in quantities apparent to one skilled in the art and in a manner similar to that shown for the single reactor scheme of FIG. 4. These steps may be repeated (with product recovery following each stage) until production of the largest particle size, zeolite product is attained.

Alternatively, zeolite particles having various particle sizes may be produced in one reactor-separator by withdrawing zeolite slurry from two or more points along the reactor. As stated previously, a controlled size gradation of zeolite solids is established within the reactor wherein small particles concentrate near the top of the reactor and large particles concentrate near the bottom of the reactor. By providing means such as tap tubes at various reactor heights, zeolite solids having various particle sizes may be withdrawn and recovered from a single reactor-separator.

Solution Polymerization of Olefins

Solution polymerization of olefins with Ziegler catalysts wherein the polymer "grows" by the reaction of soluble reactants with an active catalyst on the terminus of the polymer are known in the art and the general reaction scheme does not form a part of the present invention. Reaction temperatures for such processes are generally below about 150° C. and pressures are below about 500 psi. Monomers suitable for solution polymerization include ethylene, propylene, butene, styrene, and other alpha olefins. Ziegler catalysts are obtained by treating a compound of a Group IVB, VB, VI, VII,or VIII with a metal of Group I, II or III in metallic hydride or organic metallic form. Examples are aluminum alkyls and/or aluminum alkylhalides in combination with Group VIII metal salts such as salts of Ti, Zr, W, Cr, etc. Solvents of low density such as pentane, hexane, petroleum ether, propane, propylene, butane, butene, and other light hydrocarbons and ethers are employed in the system. Reaction temperatures range from −100° C. to +100° C., preferably from −50° C. to +20° C. Pressures range from 2000 psi to 1 atm., preferably from 500 psi to 1 atm. Residence times of reactants range generally from seconds to hours, but residence times from about 30 seconds to 1 hour are preferred.

Figure 5:
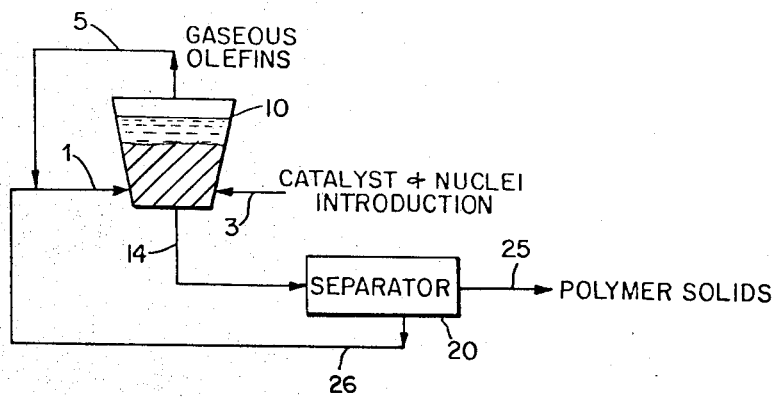
FIG. 5 is a schematic flow diagram of an embodiment of this invention for the polymerization of olefins.

Referring now to FIG. 5, the use of the reaction-separation method of the present invention will be described with reference to the solution polymerization of olefins.

Solvent and monomer are tangentially introduced through line 1 into the lower, smaller end of reactor-separator 10, thereby imparting an upward swirling motion to the reaction medium in the reactor-separator. Catalyst, preferably slurried in solvent, is introduced to reactor-separator 10 through line 3. While FIG. 5 shows single points of introduction of solvent, monomer, and catalyst into the lower portion of reactor-separator 10, it will be understood that multiple points of introduction may be used. Olefin monomer polymerizes and the polymer grows by the reaction of soluble monomer with the active catalyst. The horizontal velocity at the bottom of reactor-separator 10 is sufficient to cause fluidization or larger, solid polymer particles, concentrating them in the central, lower portion of reactor-separator 10. The vertical velocity at the top of the reactor-separator is sufficiently small to avoid carryover of the smaller solid polymer particles but sufficiently large to concentrate them in the upper portion of the reactor-separator. Gaseous olefins are withdrawn from the top of reactor-separator 10 through line 5 and recycled to the reactor-separator through line 1. If desired, nuclei comprising solid polymer particles may be introduced to reactor-separator 10 through line 3. Solid polymer product having a desired particle size is withdrawn through line 14 from the bottom of reactor-separator 10 as a solvent/polymer slurry and passes to solid polymer separator 20 wherein solid polymer product 25 is separated from solvent 26. Separator 20 comprises any of a variety of known separation techniques: percolation, screen draining, sedimentation, evaporation and/or centrifugation. Solvent recovered through line 26 is recycled to reactor-separator through line 1.

Solution polymerization of olefins according to the process of this invention provides considerable flexibility in the production of polymer particles having various particle sizes. For example, a series of two or more reactor-separators may be employed. A portion of solvent/polymer slurry withdrawn from the first reactor-separator (e.g., as a portion of the slurry passing through line 14 in FIG. 5) is passed to a second reactor-separator (not shown in FIG. 5) wherein the polymer particle size continues to grow. Make-up and recycle reagents are added to the second reactor-separator in quantities apparent to one skilled in the art and in a manner similar to that shown for the single reactor scheme of FIG. 5. These steps may be repeated (with product recovery following each stage) until production of the largest particle size, polymer product is attained.

Alternatively, polymer particles having various particle sizes may be produced in one reactor-separator by withdrawing polymer slurry from two or more points along the reactor. As stated previously, a controlled size gradation of polymer solids is established within the reactor wherein small particles concentrate near the top of the reactor and large particles concentrate near the bottom of the reactor. By providing means such as tap tubes at various reactor heights, polymer solids having various particle sizes may be withdrawn and recovered from a single reactor-separator.

What is claimed is:
1. A continuous reaction/separation method for solution polymerization of olefins over Ziegler catalysts which comprises:
  (a) tangentially introducing solvent, monomer and Ziegler catalysts into the lower, smaller end of an elongated, vertical reaction zone of inverted frusto-conical configuration, thereby imparting an upward, swirling motion to the reaction medium in the reaction zone, the horizontal velocity at the bottom of the reaction zone being sufficient to cause fluidization of larger solid polymer particles and concentration of them in the central, lower portion of the reaction zone and the vertical velocity at the top of the reaction zone being sufficiently small to avoid carry-over of smaller solid polymer particles but sufficiently large to concentrate them in the upper portion of the reaction zone;
  (b) maintaining the resulting reaction medium in the reaction zone in a swirling, fluidized state under conditions which promote the formation and growth of solid particles of polymer in solution;
  (c) withdrawing a stream comprising gaseous olefins from the top of the reaction zone and returning said gaseous olefins to the reaction zone;
  (d) withdrawing a stream comprising substantially solids-free solvent from the upper part of the reaction zone and returning the solvent to the reaction zone;
  (e) withdrawing a slurry consisting essentially of larger polymer particles and solvent from the bottom of the reaction zone; and
  (f) recovering solid polymer products from the slurry.

2. The method of claim 1 wherein the olefins polymerized are alpha olefins.

3. The method of claim 2 wherein the alpha olefins are selected from the group consisting of ethylene, propylene, butene, and styrene.

4. The method of claim 1 wherein the solvent comprises light hydrocarbons and ethers.

5. The method of claim 2 wherein the light hydrocarbons and ethers are selected from the group consisting of pentane, hexane, petroleum ether, propane, propylene, butane and butene.

6. The method of claim 1 wherein the temperature in the reaction zone is maintained within the range from about $-100°$ C. to $+100°$ C.

7. The method of claim 1 wherein the temperature is maintained within the range from about $-50°$ C. to $+20°$ C.

8. The method of claim 1 wherein the monomer residence time in the reaction zone is within the range from about 30 seconds to 1 hour.

9. The method of claim 1 wherein solid polymer nuclei are tangentially introduced into the lower, smaller end of the reaction zone.

* * * * *

UNITED STATES PATENT AND TRADEMARK OFFICE
CERTIFICATE OF CORRECTION

PATENT NO. : 4,383,094

DATED : May 10, 1983

INVENTOR(S) : Whitehurst et al

It is certified that error appears in the above-identified patent and that said Letters Patent is hereby corrected as shown below:

Col. 2, line 51, add --s-- to "a" to read "use as power plant fuel."

Col. 10, line 68, delete "to" second occurrence.

Col. 11, line 51, "1:2" should be --2:1--.

Col. 14, line 4, before "Tangentially" insert --By--.

Col. 16, line 49, "hwerein" should be --wherein--.

Signed and Sealed this

Twentieth Day of September 1983

[SEAL]

Attest:

GERALD J. MOSSINGHOFF

Attesting Officer

Commissioner of Patents and Trademarks